(12) United States Patent
Etherington et al.

(10) Patent No.: US 7,098,913 B1
(45) Date of Patent: Aug. 29, 2006

(54) METHOD AND SYSTEM FOR PROVIDING DEPTH CUES BY ATTENUATING DISTANT DISPLAYED TERRAIN

(75) Inventors: Timothy J. Etherington, Cedar Rapids, IA (US); Alex Postnikov, North Liberty, IA (US); Thomas L. Vogl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 562 days.

(21) Appl. No.: 10/208,567

(22) Filed: Jul. 30, 2002

(51) Int. Cl.
*G06T 15/50* (2006.01)
*G09G 5/00* (2006.01)
*G09G 5/02* (2006.01)

(52) U.S. Cl. .................. 345/426; 345/589; 345/629; 345/606

(58) Field of Classification Search ............... 345/606, 345/589, 169, 426, 629
See application file for complete search history.

(56) References Cited

U.S. PATENT DOCUMENTS

| 5,179,638 | A | * | 1/1993 | Dawson et al. ............. 345/606 |
| 5,357,579 | A | * | 10/1994 | Buchner et al. ............ 345/426 |
| 5,415,549 | A | * | 5/1995 | Logg .......................... 345/589 |
| 2004/0066376 | A1 | * | 4/2004 | Donath et al. .............. 345/169 |

* cited by examiner

*Primary Examiner*—Kee M. Tung
*Assistant Examiner*—Chante Harrison
(74) *Attorney, Agent, or Firm*—Nathan O. Jensen; Kyle Eppele (57) ABSTRACT

A method of increasing situational awareness of terrain is disclosed. A representation of a terrain feature is generated from a source of stored data. A distance from a reference point to the terrain feature is determined. The representation of the terrain feature is attenuated if the distance from the reference point to the terrain feature is within a predetermined range. The representation of the terrain feature is displayed.

12 Claims, 6 Drawing Sheets

FIG. 10

METHOD AND SYSTEM FOR PROVIDING DEPTH CUES BY ATTENUATING DISTANT DISPLAYED TERRAIN

FIELD OF THE INVENTION

The invention relates to displays, and more particularly, to the graphic display of terrain data on a display.

BACKGROUND OF THE INVENTION

The navigation of vehicles in low-visibility conditions such as darkness, fog, low-hanging clouds, rain, or other inclement weather has always increased the risk of accidents. Many proposals have been advanced to supplement the situational awareness of the driver/pilot of a boat, automobile, or airplane. For example, it has been proposed to generate a display of nearby terrain from a database having three-dimensional information about the terrain. The derived terrain display may be provided to assist the pilot or driver of the vehicle to maneuver the vehicle during times of low visibility. If used with an aircraft, it is especially advantageous to project the derived terrain display into the pilot's line of sight using a head-up display (HUD) system. When properly aligned with the actual terrain, the derived terrain display enhances the vision of the pilot.

Figure 1:
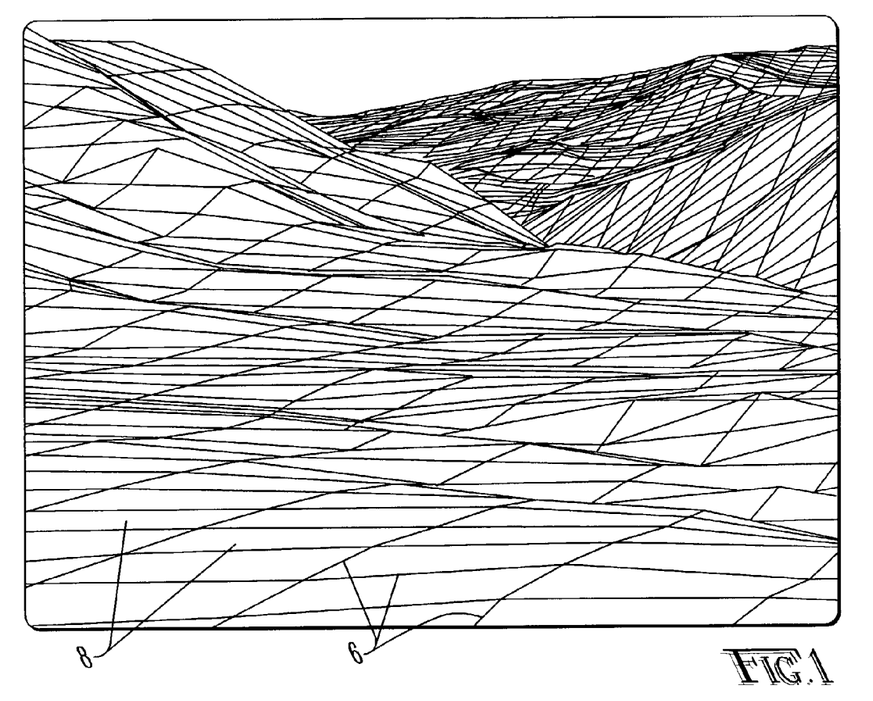
FIG. 1 is an output of a display showing an artificially derived display of terrain.

FIG. 1 is a view of a derived or artificial terrain display. It can be seen that the terrain comprises a network of lines 6 that interconnect to form a plurality of elements 8, such as quadrilaterals or triangles, in the form of a grid. In the display shown in FIG. 1, each grid element 8 defines a substantially equal surface area of the terrain. Grid elements appearing larger represent terrain that is relatively close to the viewer, and grid elements appearing smaller represent terrain that is relatively further away from the viewer. As a viewer approaches a portion of the terrain, the grid elements representing that terrain portion increase in size and appear to move toward the viewer.

One challenge of using derived or artificial terrain displays is that distant features appear to be closer than they really are. The driver or pilot cannot easily distinguish between dangerous terrain in close vicinity of the vehicle and less important obstacles in the distance. The problem is made worse when the derived terrain display uses few color shades, as is the case with most known HUD systems. Although the relative size of the grid elements provides some depth cues to the driver or pilot, confusion may still result. Also, if a derived terrain display provides a grid that is not comprised of geometric elements having substantially equal surface areas, the relative sizes of the grid elements do not provide any reliable visual depth cues.

It is therefore an object of the invention to increase the situational awareness of a driver or pilot of a vehicle such as an automobile, boat, or aircraft.

It is yet another object to provide depth cues to a driver or pilot viewing an artificial or derived representation of terrain.

A feature of the invention is an increased attenuation of the derived representation of terrain as the terrain increases in distance from a viewer.

Another feature of the invention is the elimination of displayed terrain that is beyond a predetermined distance from the viewer.

An advantage of the invention is increased awareness of relative distances of terrain in a terrain display derived from stored data.

SUMMARY OF THE INVENTION

The invention provides a method of increasing situational awareness of terrain. According to the method, a representation of a terrain feature is generated from a source of stored data. A distance from a reference point to the terrain feature is determined. The representation of the terrain feature is attenuated if the distance from the reference point to the terrain feature is within a predetermined range. The representation of the terrain feature is displayed.

The invention also provides a method of enhancing distance awareness in a derived representation of terrain. According to the method, terrain is selected for which a representation is to be derived. The terrain is viewable from a viewpoint. A data set corresponding to the selected terrain is provided. A three-dimensional representation of the terrain is derived from the data set. The representation includes a plurality of interconnected geometric elements that graphically communicate at least a relative elevation of the terrain with respect to the viewpoint. A distance is determined between the viewpoint and a portion of the selected terrain. Geometric elements corresponding to the portion of the selected terrain are attenuated if the portion of the selected terrain is beyond a predetermined distance from the viewpoint.

The invention further provides a system for providing visual depth cues in a derived representation of terrain. The system includes an image processor that combines aircraft location and direction data with terrain data to produce an image representative of viewable terrain. The image is comprised of a plurality of interconnected geometric elements. An attenuating function is applied to the image. The attenuating function reduces a viewable resolution of geometric elements corresponding to a portion of the image when a distance from a viewpoint to terrain corresponding to the portion of the image is greater than a predetermined distance.

DETAILED DESCRIPTION OF THE DRAWINGS

FIG. 1 depicts an output of a display, such as a head-up display (HUD), that shows an artificially derived depiction of terrain from the point of view of a pilot of an aircraft. The surface of the terrain is defined by a plurality of interconnected grid elements 8 representing terrain of roughly equal area. Although a pilot can infer that seemingly smaller grid squares represent terrain that is further away from seemingly larger grid elements, further depth cues may be desirable.

Figure 2:
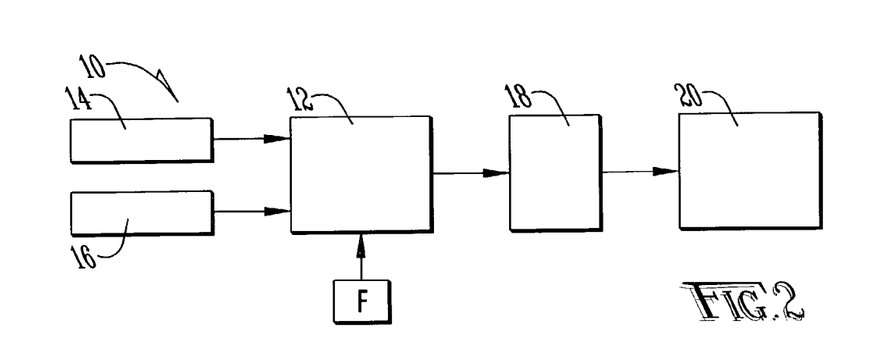
FIG. 2 is a schematic diagram of a system that provides depth cues for an artificially derived display of terrain.

A system for providing such depth cues is schematically shown in FIG. 2 and is indicated generally by reference number 10. System 10 includes a processor 12 that accepts input from a memory 14 containing terrain data. The terrain data is sufficiently detailed to permit processor to graphically construct a three-dimensional representation of terrain. Aircraft location and flight direction data is input into processor 12 from a Global Positioning System (GPS) receiver 16 or other known aircraft position location systems. The aircraft location data is combined with the terrain data to graphically construct the three-dimensional representation of terrain along an anticipated flight path from the point of view of a pilot of the aircraft as shown in FIG. 1.

Figure 3:
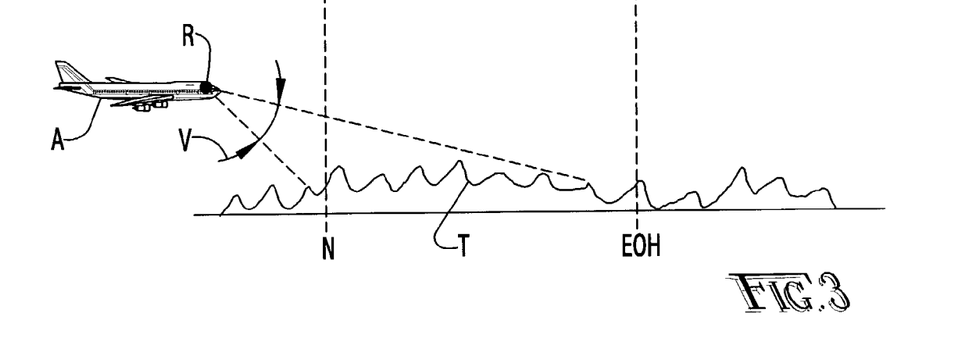
FIG. 3 is a side elevational view of an aircraft according to one embodiment of the invention.

FIG. 3 schematically depicts an airplane A over terrain T. A predetermined reference point R coincides with the pilot's point of view. Angle V represents a viewing angle that represents the pilot's view of terrain most relevant to the navigation of aircraft A. Because the terrain falling outside angle V is not as relevant as terrain within angle V, the terrain falling outside angle V will not be constructed or displayed. It can be seen that terrain closer to the aircraft than a near clipping plane N will not be represented. Likewise, terrain that is further from the aircraft than a far clipping plane or end-of-horizon EOH will not be constructed or displayed.

To provide depth cues to the displayed terrain image according to the invention, processor 12 determines the distance of each portion of the terrain within angle A. Once the distance of each portion of the displayed terrain T from reference point R has been determined, some of lines 6 defining the representation of the terrain are blurred, fogged, or otherwise attenuated based upon the distance of the lines from reference point R. As a general rule, the further the displayed terrain is from reference point R, the more blurring, fogging, or attenuation is applied to the lines representing that displayed terrain. It may also be said that no attenuation of a line equates to full or clear resolution of the line, and full attenuation equates to no resolution of the lines, or in other words, the lines are not displayed.

Figure 4:
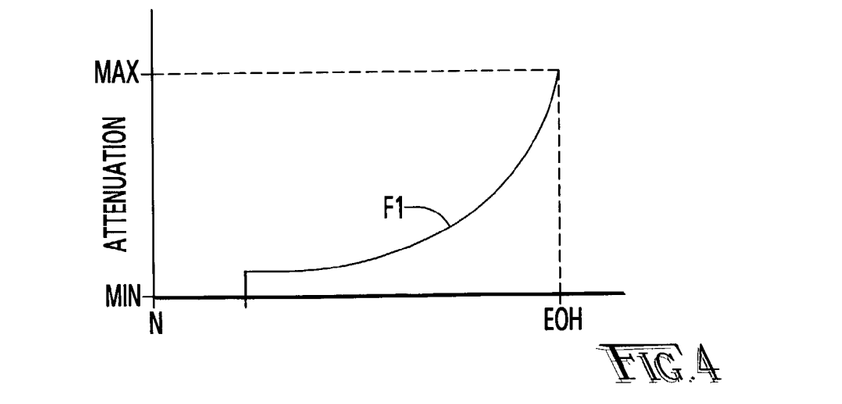
FIG. 4 is a graph expressing a resolution or attenuation function that is used with an embodiment of the invention.

FIG. 4 graphically depicts one attenuation function or strategy F1 that may be implemented by processor 12 to determine the amount of blurring, fogging, or attenuation that is applied to different portions of a derived terrain representation. The ordinate of the graph represents the distance between reference point R and a portion of the displayed terrain. The abscissa of the graph represents the increase in attenuation of the lines defining the portion of the displayed terrain. Portions of the derived terrain representation corresponding to terrain that is relatively near reference point R are subjected to no attenuation, while portions of the derived terrain representation corresponding to terrain further away from the reference point are subjected to higher degrees of attenuation. Portions of the derived terrain representation corresponding to terrain beyond end-of-horizon EOH are completely attenuated. The use of an end-of-horizon EOH provides a defined horizon and ensures that distant displayed terrain relevant to the flight decisions of an aircraft pilot maintains some semblance of resolution and that the representation of infinitely distant terrain does not needlessly obfuscate the displayed terrain representation. Attenuation function F1 shown in FIG. 4 increases exponentially between reference point R and end-of-horizon EOH.

Figure 5:
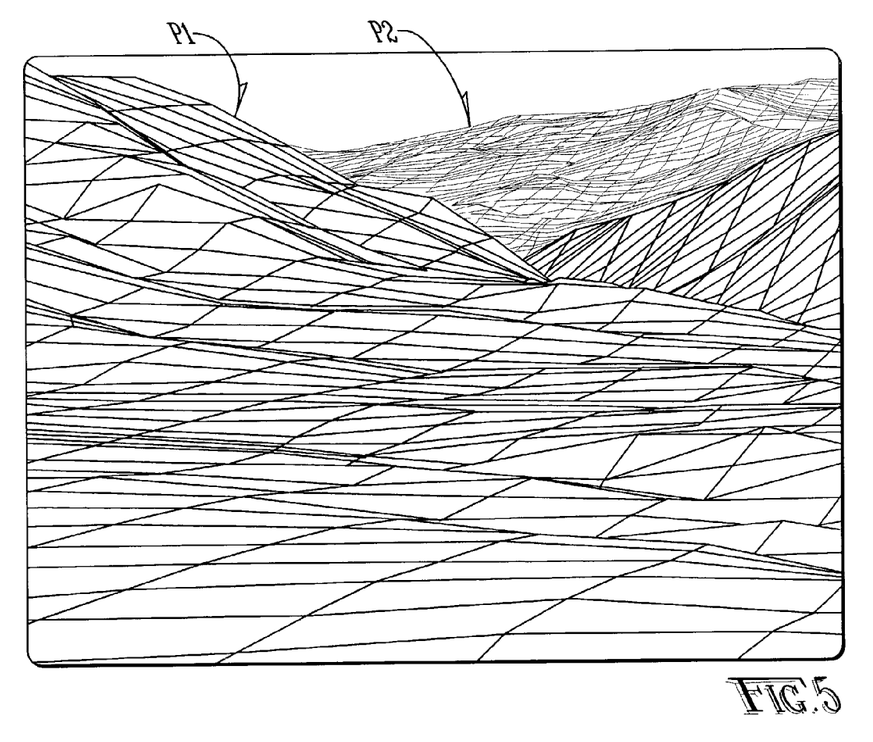
FIG. 5 is an output of a display showing an artificially derived display of terrain using depth cues according to the invention.

Processor 12 applies attenuation function F1 to the lines, grids, or other portions of the displayed terrain. As can be seen in FIG. 5, portions P1 of terrain that are relatively close to reference point R are subject to little if any attenuation, while portions P2 of terrain that are further distant from reference point R are subject to increasingly higher degrees of blurring, fogging, or attenuation. Processor supplies the attenuated terrain image to a viewable display, which may be a HUD system having a HUD system computer 18 (FIG. 2) that combines the attenuated terrain image with other information and sends the combined information to a HUD combiner 20 for simultaneous viewing with actual terrain. By attenuating distant terrain in an artificially-derived or synthetic terrain representation, the depth or distance awareness of a pilot is greatly enhanced.

Figure 6:
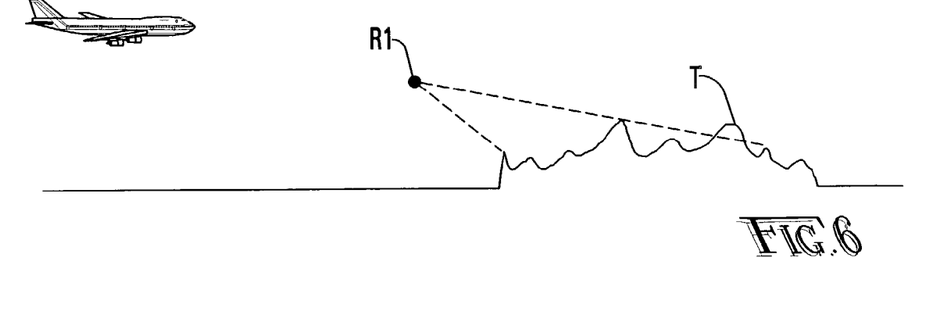
FIG. 6 is a side elevational view of an aircraft according to another embodiment of the invention.

The above description is but one embodiment of the invention as envisioned by the inventors. For example, reference point R has been defined as coincident with the location of the pilot of an aircraft. However the reference point may alternatively be placed in other locations. For example, in FIG. 6 reference point R1 is located some distance away from aircraft A but adjacent terrain T over which the pilot plans to fly. System 10 may be programmed to move reference point R1 along a predetermined route or flight plan such that the representation of the terrain is displayed in a manner to approximate the planned flight over the terrain. The altitude and speed of the simulated fly-over may be varied according to the needs of the pilot. This "variable reference point" feature permits the pilot to prepare to fly over challenging terrain. System 10 may be programmed to switch between reference point R and reference point R1 either automatically or in response to a command by a pilot or other user.

Figure 7:
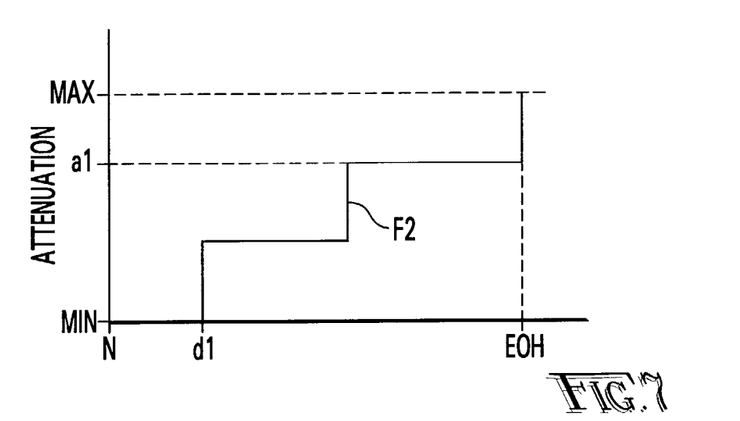
FIG. 7 is a graph expressing a resolution or attenuation function that is used with another embodiment of the invention.
Figure 8:
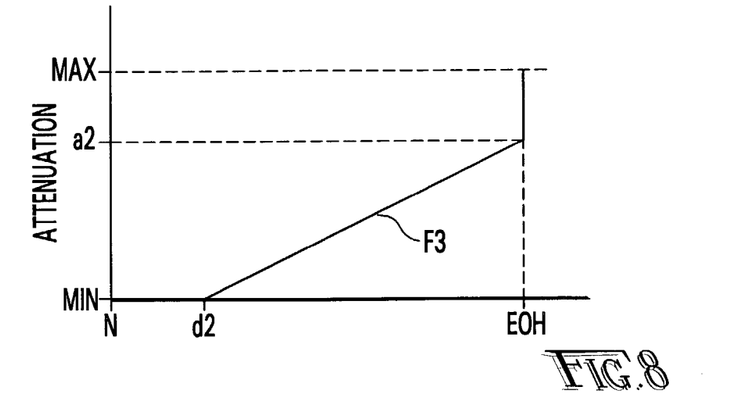
FIG. 8 is a graph expressing a resolution or attenuation function that is used with another embodiment of the invention.
Figure 9:
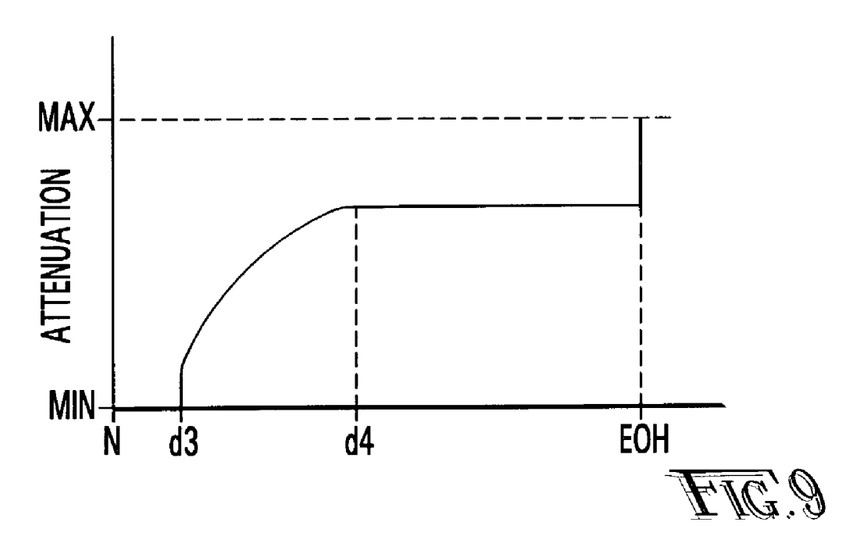
FIG. 9 is a graph expressing a resolution or attenuation function that is used with another embodiment of the invention.

FIGS. 7, 8 and 9 depict additional attenuation functions that may be used with the invention. FIG. 7 shows a stepped attenuation function F2 in which no attenuation is applied to portions of the displayed terrain that are less than a distance d1 from near clipping plane N. Also, distant portions of the displayed terrain maintain a minimum resolution a1 as they approach from end-of-horizon EOH. This may be done to ensure that distant portions of the displayed terrain possess enough resolution to be identifiable. Stepped attenuation function F2 may include any number of steps as desired.

FIG. 8 shows another attenuation function in which no attenuation is applied to portions of the displayed terrain that are less than a distance d2 from near clipping plane N. Attenuation then increases linearly to an attenuation level a2 as the distance of the displayed terrain increases between distance d2 and end-of-horizon EOH.

FIG. 9 shows yet another attenuation function in which attenuation is applied to portions of the displayed terrain that are less than a distance d3 from near clipping plane N. Attenuation then increases exponentially or logarithmically to an attenuation level a3 at distance d4. The attenuation level is maintained at level a3 until end-of-horizon EOH is reached. Other attenuation functions are possible, including functions incorporating curved portions, and are considered to be within the scope of the invention.

Figure 10:
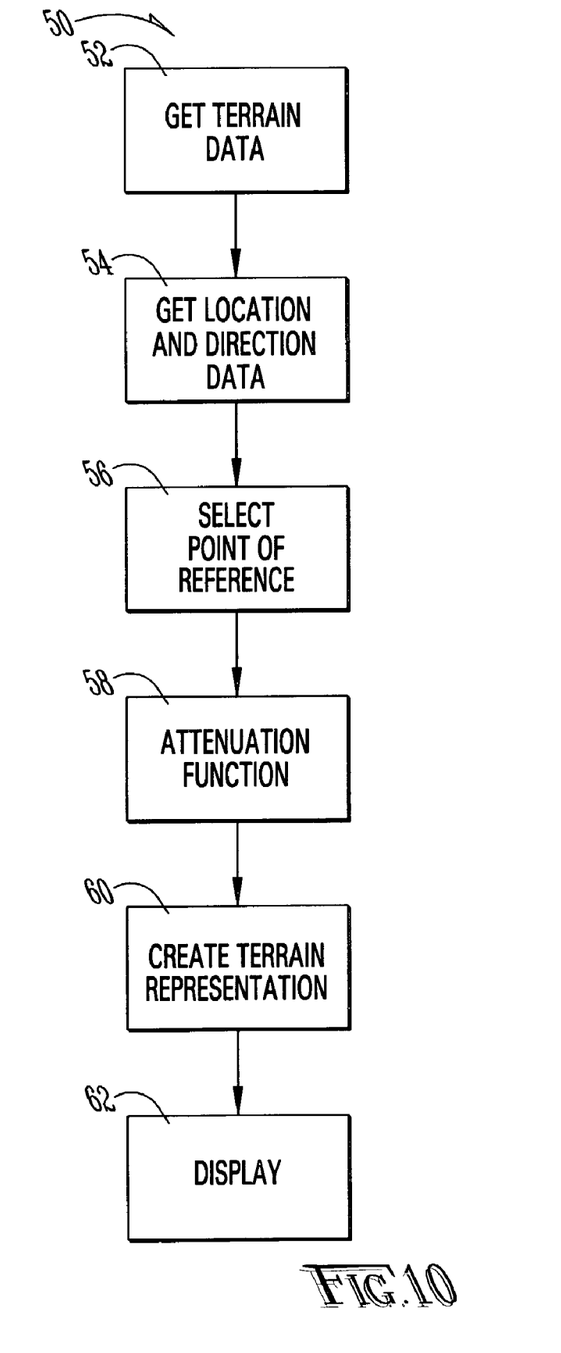
FIG. 10 is a flowchart depicting a method of providing depth cues for an artificially derived display of terrain according to an embodiment of the invention.

FIG. 10 is a flowchart that discloses a method 50 of providing visual depth cues to a viewer of an artificially-derived display of terrain. In step 52, terrain data is obtained from a memory. In step 54, location and direction data of a viewer is obtained from a GPS receiver or other source. In step 56, a point of reference and a viewing angle are selected. The point of reference may be the location of the viewer or a location adjacent terrain to be encountered later in flight. In step 58 an attenuation function is selected, which may be one of those represented in FIGS. 3, 7, 8, 9, or some other function. In step 60 a representation of terrain is created, with portions of the representation of terrain corresponding to terrain further away from the point of reference attenuated, fogged, or blurred according to the selected attenuation function. In step 62 the created and attenuated terrain representation is displayed, for example, on an avionics or automotive display or on a HUD display. The various steps of method 50 may be performed in other sequences as desired.

The above embodiments have described the invention as a navigation aid for an airplane or other flying craft. The invention has equal utility with other types of vehicles such as automobiles and other land-based vehicles, boats and other watercraft, as well as enhanced vision systems designed for individual or personal use. Furthermore, the attenuated representation of the terrain may be overlaid upon a head-down display or even a view of the actual terrain derived from a camera, infrared sensor, or other sensor.

An advantage of the invention is that a viewer of the derived terrain display is provided with visual depth cues so that the viewer may properly judge the relative distance of terrain features shown in the display.

Another advantage is that the addition of visual depth cues according to the invention will typically require little or no additional equipment beyond what is required to create the derived terrain display. The attenuation (or resolution) function may reside within the image processor, and the selection of a point of reference may be automatically made depending upon the characteristics of the viewed terrain.

Still another advantage is that, when overlaid upon and aligned with a viewer's view of actual terrain, the viewer's awareness of the terrain is significantly enhanced, especially during times of low visibility due to darkness, inclement weather, or the like.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of enhancing distance awareness in a derived representation of terrain, comprising:
    selecting terrain for which a representation is to be derived, said terrain being viewable from a viewpoint;
    providing a data set corresponding to the selected terrain;
    deriving, from the data set, a three-dimensional representation of the terrain, said representation comprising a plurality of interconnected geometric elements that graphically communicate at least a relative elevation of the terrain with respect to the viewpoint;
    determining a distance between the viewpoint and a portion of the selected terrain; and
    attenuating geometric elements corresponding to said portion if said portion is beyond a predetermined distance from the viewpoint, said attenuation applied according to a function that
        maintains a minimum attenuation for portions of the representation closest to the viewpoint,
        increases, using a quantum change, to an intermediate attenuation value for portions of the representation at an intermediate distance from the viewpoint, and
        exponentially increases the attenuation applied to portions of the representation from the intermediate attenuation value at the intermediate distance, to a maximum attenuation value at a maximum visibility distance; and
    displaying the attenuated representation of the terrain.

2. The method of claim 1, further including displaying the derived representation of the terrain for simultaneous viewing with an actual view of the terrain.

3. The method of claim 2, wherein the derived representation of the terrain is overlaid upon an actual view of the terrain.

4. The method of claim 1, wherein the representation of the terrain is displayed in a vehicle, and wherein the viewpoint is located adjacent terrain that is beyond the maximum visibility distance of a viewer in the vehicle so that the representation of the terrain is viewed prior to encountering the terrain.

5. The method of claim 1, wherein the viewpoint is located at a vehicle in which the derived representation of the terrain is displayed.

6. The method of claim 1, further including fully attenuating the representation of the terrain when the terrain is further from the viewpoint than the maximum visibility distance.

7. The method of claim 1, wherein the representation of the terrain is displayed in a vehicle, and further including fully attenuating the representation of the terrain when the terrain is closer to the viewpoint than the maximum visibility distance of a viewer in the vehicle.

8. A method of enhancing distance awareness in a derived representation of terrain, comprising:
    selecting terrain for which a representation is to be derived, said terrain being viewable from a viewpoint;
    providing a data set corresponding to the selected terrain;
    deriving, from the data set, a three-dimensional representation of the terrain, said representation comprising a plurality of interconnected geometric elements that graphically communicate at least a relative elevation of the terrain with respect to the viewpoint;
    determining a distance between the viewpoint and a portion of the selected terrain; and
    attenuating geometric elements corresponding to said portion if said portion is beyond a predetermined distance from the viewpoint, said attenuation applied according to a function that
  maintains a minimum attenuation for portions of the representation closest to the viewpoint,
  non-linearly increases to an intermediate attenuation value for portions of the representation between a first intermediate distance from the viewpoint and a second intermediate distance from the viewpoint,
  maintains the intermediate attenuation value for portions of the representation between the second intermediate distance and a maximum visibility distance, and
  increases attenuation applied to portions of the representation to a maximum attenuation value at the maximum visibility distance; and
displaying the attenuated representation of the terrain.

9. The method of claim 8, wherein the representation of the terrain is displayed in a vehicle, and wherein the viewpoint is located adjacent terrain that is beyond the maximum visibility distance of a viewer in the vehicle so that the representation of the terrain is viewed prior to encountering the terrain.

10. The method of claim 8, further including displaying the derived representation of the terrain for simultaneous viewing with an actual view of the terrain.

11. The method of claim 8, wherein the derived representation of the terrain is overlaid upon an actual view of the terrain.

12. The method of claim 8, wherein the viewpoint is located at a vehicle in which the derived representation of the terrain is displayed.

* * * * *